(12) United States Patent
Kobayashi

(10) Patent No.: US 10,232,546 B2
(45) Date of Patent: Mar. 19, 2019

(54) FILAMENT WINDING SYSTEM

(71) Applicant: TOYOTA JIDOSHA KABUSHIKI KAISHA, Toyota-shi (JP)

(72) Inventor: Tomoyoshi Kobayashi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/934,071

(22) Filed: Mar. 23, 2018

(65) Prior Publication Data

US 2018/0272592 A1 Sep. 27, 2018

(30) Foreign Application Priority Data

Mar. 24, 2017 (JP) ................................ 2017-058532

(51) Int. Cl.
| | | |
|---|---|---|
| *B29C 53/60* | (2006.01) | |
| *B29C 53/66* | (2006.01) | |
| *F17C 1/06* | (2006.01) | |
| *B29C 53/80* | (2006.01) | |
| *B29C 70/24* | (2006.01) | |

(52) U.S. Cl.
CPC .......... *B29C 53/665* (2013.01); *B29C 53/605* (2013.01); *B29C 53/8016* (2013.01); *B29C 70/24* (2013.01); *F17C 1/06* (2013.01); *B29C 53/8041* (2013.01); *F17C 2203/012* (2013.01); *F17C 2203/0604* (2013.01); *F17C 2209/2163* (2013.01); *F17C 2260/011* (2013.01)

(58) Field of Classification Search
CPC ... B29C 53/602; B29C 53/605; B29C 53/665; B29C 53/8041; B29C 70/24; B29C 70/54; F17C 1/06; F17C 2203/012; F17C 2203/0604; F17C 2209/2163; F17C 2260/011
See application file for complete search history.

(56) References Cited

U.S. PATENT DOCUMENTS 5,307,609 A * 5/1994 Kurata .................. B29C 55/045
264/290.2
5,359,408 A * 10/1994 Inada .................... B65H 63/006
250/223 R (Continued)

FOREIGN PATENT DOCUMENTS

JP 2014-233852 12/2014

*Primary Examiner* — Emmanuel M Marcelo
(74) *Attorney, Agent, or Firm* — Oblon, McClelland, Maier & Neustadt, L.L.P.

(57) ABSTRACT

A filament winding system includes a storage unit that stores in advance a reference shape of a winding object, and winding conditions including a winding position and a winding angle at which a fiber is wound around the winding object having the reference shape, a guide that is movable relative to the winding object, and feeds the fiber onto the winding object, a rotating device that rotates the winding object, such that the fiber fed from the guide is wound around the winding object, a measuring unit that measures a shape of the winding object, and a controller. When there is a difference between the reference shape stored in the storage unit, and the measured shape of the winding object, the controller corrects the winding conditions so as to reduce or eliminate the difference, and controls the guide according to the corrected conditions.

4 Claims, 4 Drawing Sheets

(56) References Cited

U.S. PATENT DOCUMENTS

| | | | |
|---|---|---|---|
| 2010/0066472 A1* | 3/2010 | Orlando | H01F 17/0033 335/282 |
| 2011/0287676 A1* | 11/2011 | Ichikawa | B41N 1/247 442/1 |
| 2014/0053654 A1* | 2/2014 | Rogge | G01L 1/24 73/800 |
| 2014/0275997 A1* | 9/2014 | Chopra | A61B 5/064 600/424 |
| 2016/0341359 A1* | 11/2016 | Nishibu | B29C 53/605 |

* cited by examiner

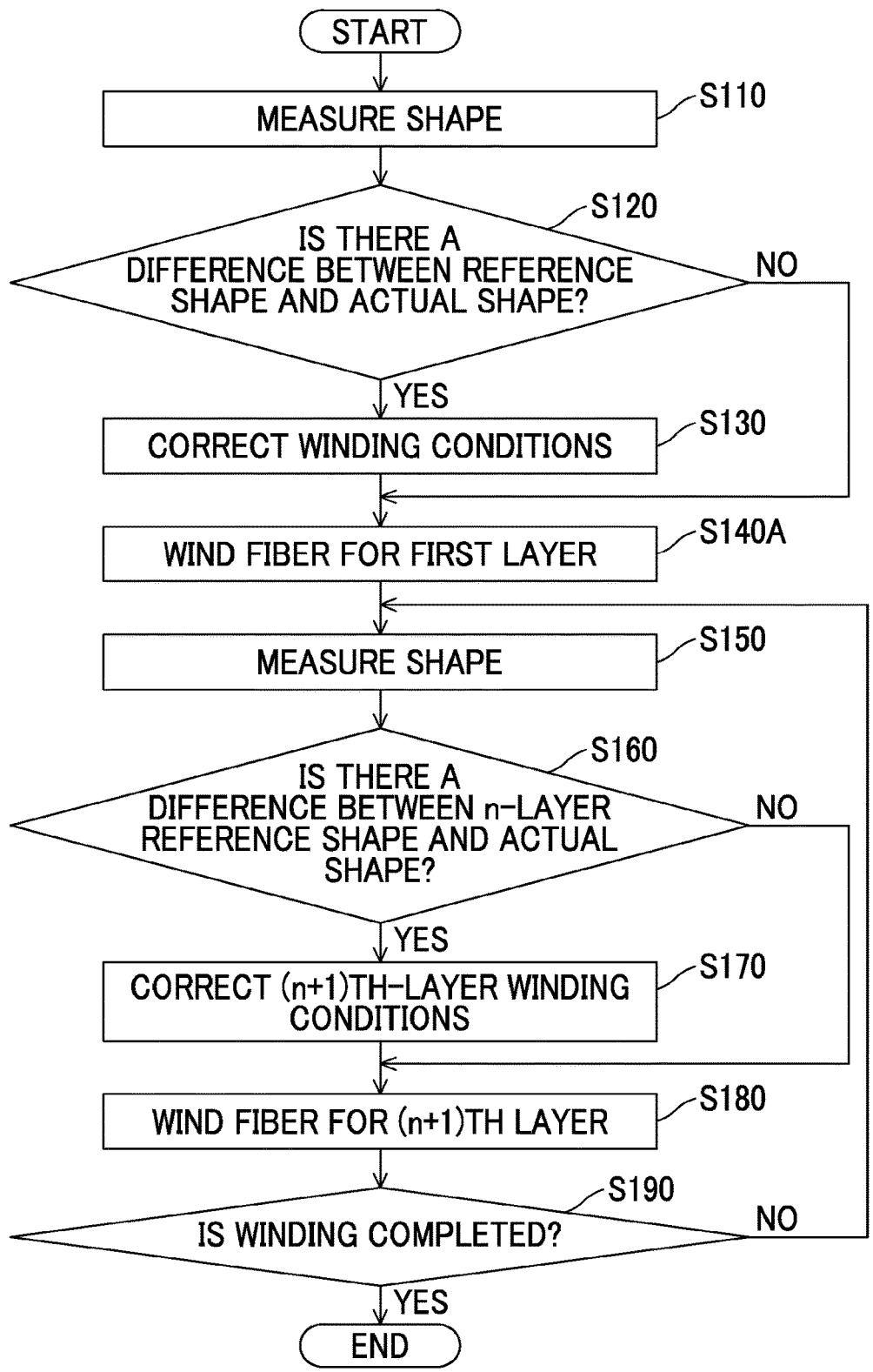

FILAMENT WINDING SYSTEM

INCORPORATION BY REFERENCE

The disclosure of Japanese Patent Application No. 2017-058532 filed on Mar. 24, 2017 including the specification, drawings and abstract is incorporated herein by reference in its entirety.

BACKGROUND

1. Technical Field

The disclosure relates to a filament winding system.

2. Description of Related Art

As a method of producing a high-pressure fluid tank, a filament winding method (which will also be called "FW method") is known (see Japanese Patent Application Publication 2014-233852 (JP 2014-233852 A), for example). According to the FW method, reinforcement fibers impregnated in advance with thermosetting resin is wound around the outer periphery of a winding object, to form a number of fiber layers on the object, and the thermosetting resin is thermally cured. By using the FW method, it is possible to form a high-strength fiber-reinforced resin layer on a surface layer of the winding object.

When the high-pressure fluid tank is produced using the FW method, the fibers need to be appropriately wound around the winding object, so as to achieve desired strength. In JP 2014-233852 A, a method for checking the winding position and folding radius of the fibers on dome portions of a liner as the winding object, so as to grasp the winding position of the fibers, is presented.

SUMMARY

However, in the method of JP 2014-233852 A, the shape of the winding object is not taken into consideration; therefore, a winding error may occur due to variations in the shape of the winding object.

A filament winding system according to one aspect of the disclosure includes a storage unit that stores in advance a reference shape of a winding object, and winding conditions including a winding position and a winding angle at which a fiber is wound around the winding object having the reference shape, a guide that is movable relative to the winding object, and is configured to feed the fiber onto the winding object, a rotating device configured to rotate the winding object, such that the fiber fed from the guide is wound around the winding object, a measuring unit configured to measure a shape of the winding object, and a controller configured to control the guide and the measuring unit. The controller causes the measuring unit to measure the shape of the winding object. When there is a difference between the reference shape stored in the storage unit, and the shape of the winding object measured by the measuring unit, the controller corrects the winding conditions so as to reduce or eliminate the difference, and control the guide according to the corrected winding conditions, such that the fiber is wound around the winding object. The filament winding system according to this aspect can reduce or eliminate an error in winding of the fiber caused by variations in the shape of the winding object, by correcting the winding conditions using the shape of the winding object.

The storage unit may further store a plurality of sets of winding conditions corresponding to a plurality of differences. When there is the difference between the reference shape stored in the storage unit, and the shape of the winding object measured by the measuring unit, the controller may change the winding conditions to the winding conditions corresponding to the difference, and controls the guide according to the corresponding winding conditions, such that the fiber is wound around the winding object. With this arrangement, the winding conditions corresponding to the difference are stored in advance, and therefore, the computation load can be reduced.

The storage unit may further store in advance an n-layer reference shape as a shape obtained after n layers of the fiber are wound around the winding object having the reference shape, and (n+1)th-layer winding conditions including a winding position at which the fiber is wound around the winding object having the n-layer reference shape, where n is a positive integer. The controller may cause the measuring unit to measure a shape obtained by winding the n layers of the fiber around the winding object. When there is the difference between the n-layer reference shape stored in the storage unit, and the shape obtained by winding the n layers of the fiber around the winding object, the controller may correct the (n+1)th-layer winding conditions so as to reduce or eliminate the difference, and controls the guide according to the corrected (n+1)th-layer winding conditions, such that the fiber is wound around the winding object. With this arrangement, the winding conditions are corrected using the shape of the winding object around which the fiber is being wound, so that an error in winding of the fiber caused by variations in the shape of the winding object can be efficiently reduced or eliminated.

An embodiment of this disclosure may be realized in various forms. For example, an embodiment of the disclosure may be realized in the form of a method of controlling the filament winding system, or a computer program for realizing the control method, or a recording medium on which the computer program is recorded, or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart illustrating a control routine of a third embodiment.

DETAILED DESCRIPTION OF EMBODIMENTS

A. First Embodiment

A1. Configuration of Winding Object

Figure 1:
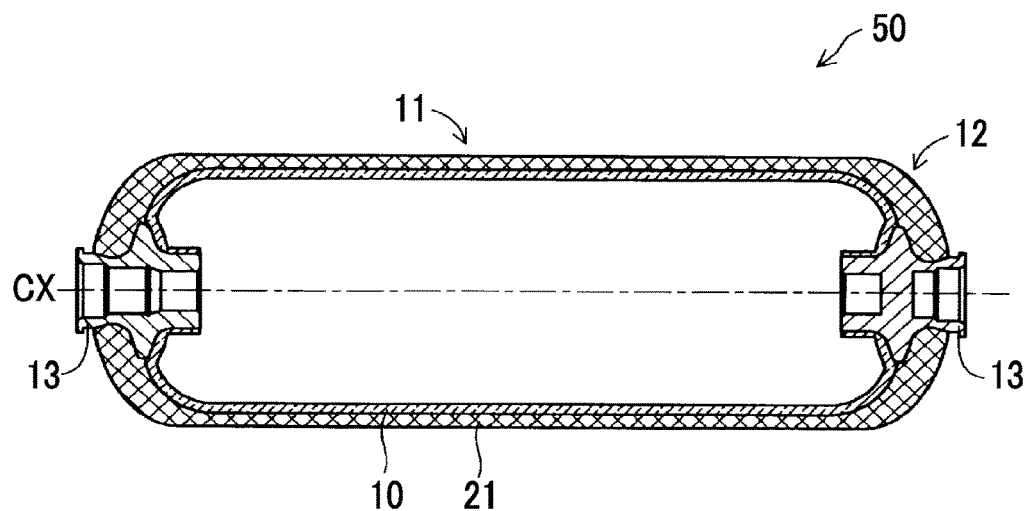
FIG. 1 is a schematic cross-sectional view of a tank used in a first embodiment.

FIG. 1 is a schematic cross-sectional view of a tank 50 used in a first embodiment. The schematic cross-sectional view of FIG. 1 shows the tank 50 at the time when the tank 50 is cut along a cutting plane that passes its center axis CX. In this embodiment, a liner 10 is used as a winding object, and the tank 50 is a gas tank used for a fuel cell.

The tank 50 includes the liner 10 having cap portions 13, and a fiber layer 21. The liner 10 is an airtight container that contains gas to be supplied to the fuel cell. The liner 10 includes a generally cylindrical body portion 11 formed in a central portion thereof, and generally semispherical dome portions 12 formed continuously from the opposite ends of the body portion 11. As a material of the liner 10, a high-strength aluminum material or stainless material, or a resin material may be used.

The cap portions 13 are provided at distal ends of the dome portions 12, and are formed of metal. The cap portions 13 serve as pipes through which gas is supplied into the liner 10. The fiber layer 21 is provided for increasing the strength of the tank 50. In this embodiment, fibers that constitute the fiber layer 21 are carbon fibers, which are impregnated in advance with epoxy resin as a thermosetting resin. As a material of the fibers, rayon-containing carbon fibers, poly acrylonitrile (PAN)-containing carbon fibers, or pitch-containing carbon fibers may be used, for example.

A2. Configuration of Filament Winding System 100

Figure 2:
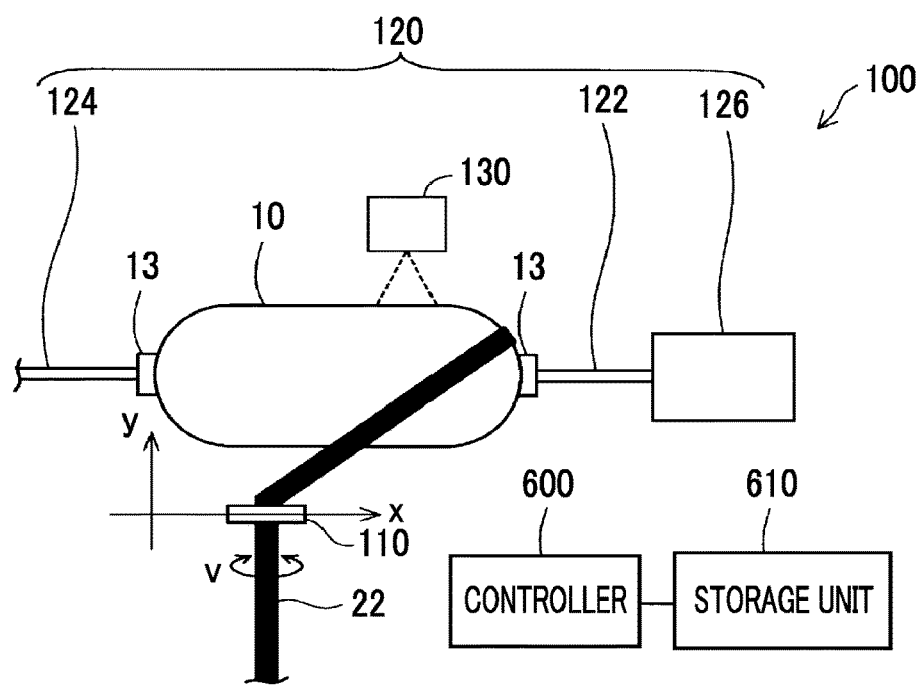
FIG. 2 is a schematic view showing the configuration of a filament winding system.

FIG. 2 is a schematic view showing the configuration of a filament winding system 100 as the first embodiment. The filament winding system 100 is a device for winding a bundle of fibers (which will be simply called "fiber") 22 around the outer periphery of the liner 10, according to a filament winding method. The filament winding system 100 includes a guide 110, rotating device 120, measuring unit 130, controller 600, and a storage unit 610.

The guide 110 is movable relative to the liner 10, and serves to feed the fiber 22 reeled out from a bobbin (not shown), onto the liner 10 as the winding object. In this embodiment, the guide 110 is movable in a direction of the center axis of the liner 10 (x-axis direction in FIG. 2), and in a direction in which the liner 10 and the guide 110 come close to each other (y-axis direction in FIG. 2). Also, in this embodiment, the guide 110 has a rectangular plane that is in contact with the fiber 22, and swings about an axis (v-axis in FIG. 2) parallel to the short-hand direction of the plane that is in contact with the fiber 22, such that the fiber 22 reeled out can move in a direction perpendicular to the x-axis and the y-axis. By controlling the guide 110, it is possible to control the winding position and winding angle of the fiber 22 on the liner 10.

The rotating device 120 rotates the liner 10 so as to wind the fiber 22 reeled out from the guide 110, around the liner 10. The rotating device 120 includes a rotating rod 122, a support rod 124, and a motor 126. One end of the rotating rod 122 is connected to the motor 126, and the other end is fixed to one of the cap portions 13 included in the liner 10. One end of the support rod 124 is fixed to the other cap portion 13 included in the liner 10. The rotating rod 122 and the support rod 124 are both fixed to the cap portions 13 while being inserted in the cap portions 13. When the motor 126 rotates, the liner 10 rotates about the center axis along with the rotating rod 122, so that the rotating device 120 can wind the fiber 22 around the liner 10 while applying tension to the fiber 22.

The measuring unit 130 is a device for measuring the shape of the liner 10. The measuring unit 130 is movable in the longitudinal direction of the liner 10, and is able to measure the shape of the liner 10 before the fiber 22 is wound around the liner 10, and the shape of the liner 10 in a condition where the fiber 22 is wound around the liner 10. In this embodiment, a laser displacement meter is used as the measuring unit 130.

The controller 600 is a control unit for controlling each device of the filament winding system 100. The controller 600 controls at least the guide 110 and the measuring unit 130. The controller 600 includes CPU, RAM, and ROM (not shown) used for control of each device. The controller 600 controls each device of the filament winding system 100, so as to wind the fiber 22 on (around) the liner 10 with desired tension, at desired position and angle.

The storage unit 610 is electrically connected with the controller 600, and stores a reference shape and winding conditions in advance. The reference shape is a basic or standard shape of the winding object. The winding conditions are conditions under which the fiber 22 is wound around the winding object. In this embodiment, the winding conditions include the winding position and the winding angle. Here, the winding position refers to a position at which the fiber 22 contacts with the winding object. The winding angle refers to an angle formed by a straight line that passes a position at which the fiber 22 is reeled out and the winding position, and the center axis of the liner 10. The winding conditions may further include the winding rate. The winding rate refers to a length of the fiber wound around the winding object per unit time.

A3. Control Routine of Filament Winding System 100

Figure 3:
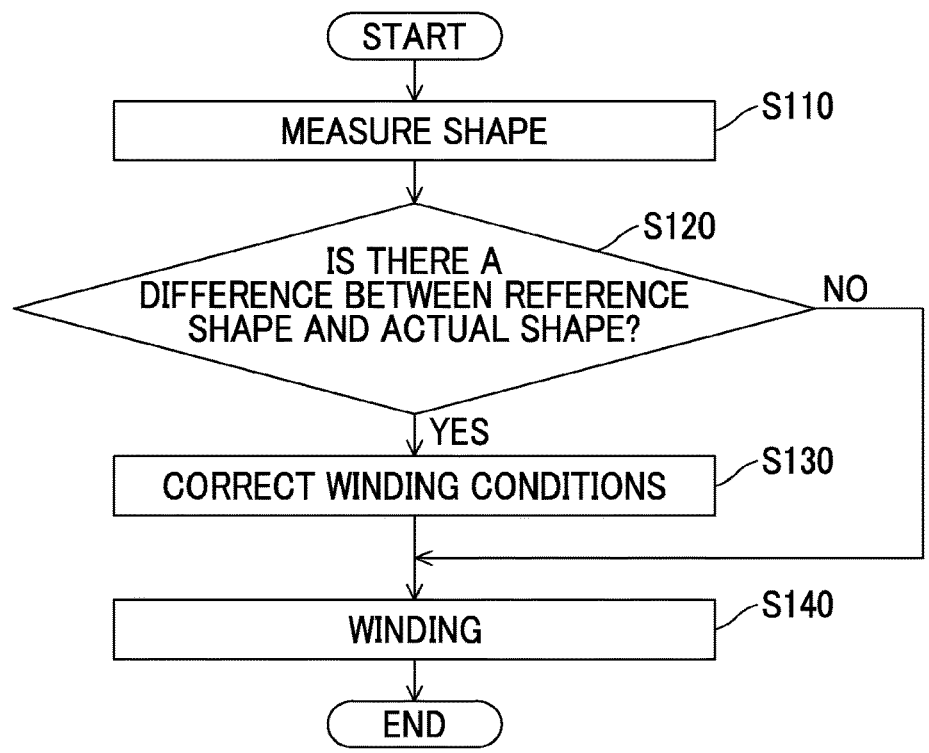
FIG. 3 is a flowchart illustrating a control routine of the filament winding system.

FIG. 3 is a flowchart illustrating a control routine of the filament winding system 100. In this embodiment, when the user sets a start button (not shown) of the filament winding system 100 to ON, the control routine of the filament winding system 100 is executed.

If the start button is set to ON, the controller 600 causes the measuring unit 130 to measure the shape of the liner 10 as the winding object (step S110). In this embodiment, the measuring unit 130 moves the liner 10 in the longitudinal direction, so as to measure the overall shape of the liner 10 from one of the cap portions 13 included in the liner 10, to the other cap portion 13

Then, the controller 600 determines the presence or absence of a difference between the reference shape of the liner 10 stored in the storage unit 610, and the actual shape of the liner 10 measured by the measuring unit 130 (step S120). In this embodiment, the controller 600 determines that there is a difference when the difference is larger than a preset value, and determines that there is no difference when the difference is equal to or smaller than the preset value. In this embodiment, the determination is made using a distance between a position at which the fiber 22 is expected to contact with the liner 10 having the reference shape, and a position at which the fiber 22 is expected to contact with the liner 10 having the actual shape. In this embodiment, the controller 600 determines that there is a difference when the above distance is larger than 5 mm, and determines that there is no difference when the above distance is equal to or smaller than 5 mm.

If the controller 600 determines that there is a difference between the reference shape and the actual shape (step S120: YES), the controller 600 corrects the winding conditions so as to eliminate the difference between the reference shape and the actual shape (step S130). Then, the controller 600 controls the guide 110 under the corrected winding conditions, so as to wind the fiber 22 around the liner 10 (step S140).

If the controller 600 determines that there is no difference between the reference shape and the actual shape (step S120: NO (see FIG. 3)), the controller 600 controls the guide 110 under the winding conditions stored in advance in the storage unit 610, so as to wind the fiber 22 around the liner 10 (step S140). Thus, the control routine of the filament winding system 100 ends.

Figure 4:
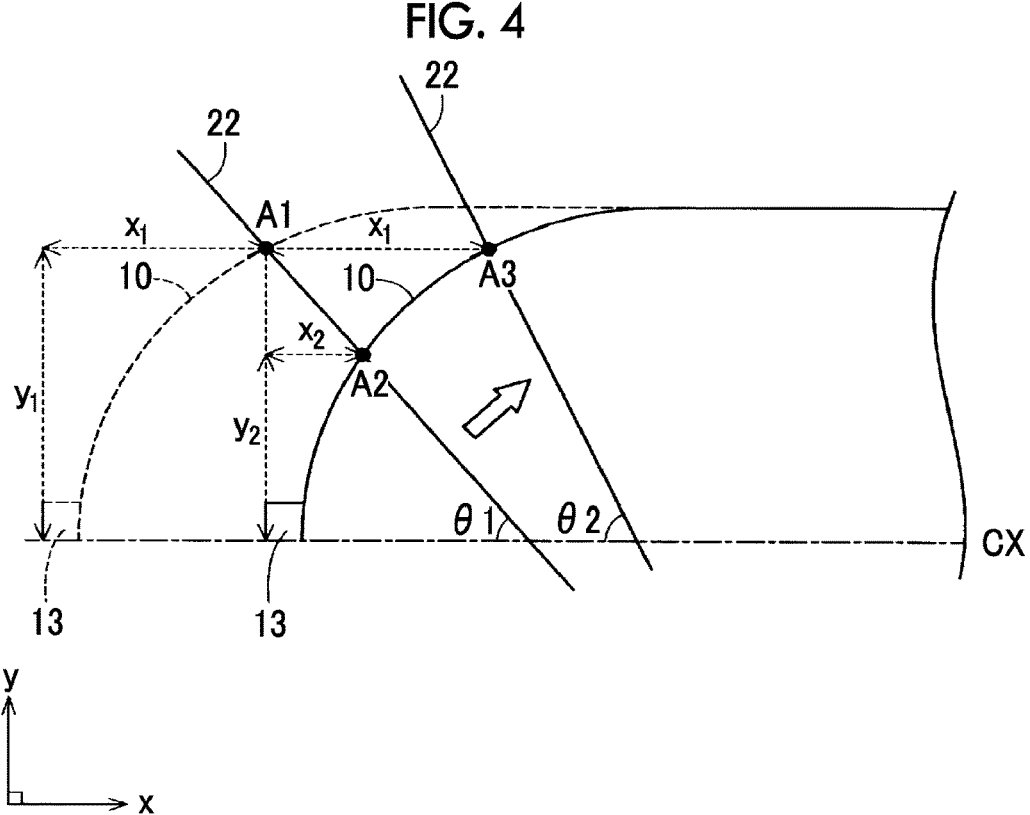
FIG. 4 is a view useful for explaining a method of correcting winding conditions in the first embodiment.

FIG. 4 is a view useful for explaining a method of correcting the winding conditions in this embodiment. In FIG. 4, the reference shape of the liner 10 is indicated by a broken line, and the actual shape of the liner 10 is indicated by a solid line. In FIG. 4, the horizontal axis is the x-axis as the direction of the center axis of the liner 10, and the vertical axis is the y-axis as a radial direction of the liner 10.

FIG. 4 illustrates the case where a distal end of the cap portion 13 in the actual shape of the liner 10 is displaced to the right in FIG. 4, as compared with the reference shape of the liner 10. Here, in the reference shape (indicated by the broken line) of the liner 10, the position at which the fiber 22 is expected to contact with the liner 10 is assumed to be position A1 that is spaced from the distal end of the cap portion 13 by x1 in the direction of the center axis (x-axis direction), and y1 in the radial direction (y-axis direction). In this case, in the actual shape (indicated by the solid line) of the liner 10, the position at which the fiber 22 is expected to contact with the liner 10 is position A2 that is spaced from the distal end of the cap portion 13 by x2 in the direction of the center axis (x-axis direction), and y2 in the radial direction (y-axis direction). Namely, in this case, even if the fiber 22 is located at the position designated by the controller 600, the winding position A1 in the reference shape of the liner 10 is different from the winding position A2 in the actual shape of the liner 10. Therefore, the controller 600 calculates the winding position and winding angle through computations, so as to eliminate the distance between the position A1 and the position A2. More specifically, the controller 600 corrects the winding position to position A3 that is spaced from the distal end of the cap portion 13 by x1 in the direction of the center axis (x-axis direction), and y1 in the radial direction (y-axis direction). Also, the controller 600 corrects the winding angle from an angle θ1 formed by a straight line passing the position at which the fiber 22 is reeled out from the guide 110, and the position A1, and the center axis of the liner 10, to an angle θ2 formed by a straight line passing the position at which the fiber 22 is reeled out from the guide 110, and the position A3, and the center axis of the liner 10.

According to the filament winding system 100 of this embodiment, it is possible to reduce or eliminate an error in winding of the fiber 22 caused by variations in shape among individual liners 10. Consequently, it is possible to curb a shortage of the strength of the tank 50 due to the error in winding of the fiber 22.

B. Second Embodiment

Figure 5:
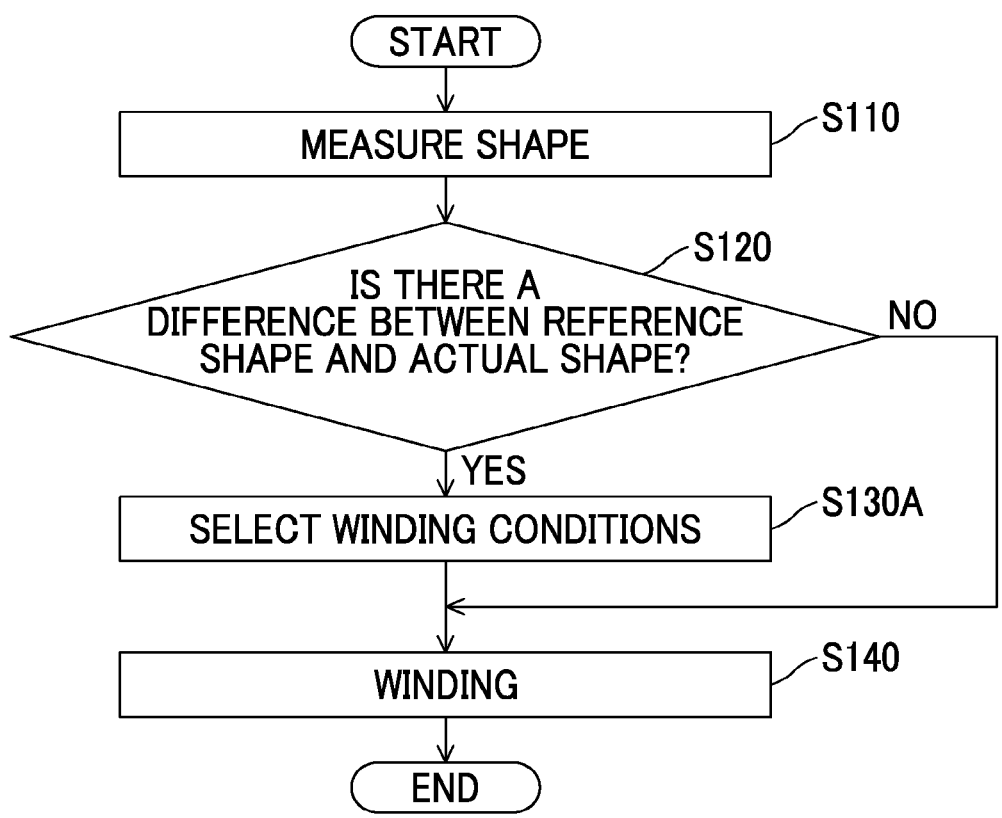
FIG. 5 is a flowchart illustrating a control routine of a second embodiment.

FIG. 5 is a flowchart illustrating a control routine of a second embodiment. A filament winding system of the second embodiment is different from that of the first embodiment in that a plurality of sets of winding conditions corresponding to differences between the reference shape and the actual shape are further stored in the storage unit 610; however, the system of the second embodiment is identical with that of the first embodiment in other respects. Also, the control routine of the second embodiment is different from that of the first embodiment in that the routine includes step S130A, in place of step S130, but the control routine of the second embodiment is identical with that of the first embodiment in other respects.

Here, the winding conditions corresponding to a difference between the reference shape and the actual shape include, for example, winding conditions that the winding position is position A3, and the winding angle is θ2, when the winding position in the actual shape of the liner 10 becomes position A2 where the winding position in the reference shape of the liner 10 is A1 and the winding angle is θ1, as shown in FIG. 4. In this embodiment, a plurality of items of information representing corresponding winding conditions, which are uniquely obtained once the winding position and winding angle in the reference shape of the liner 10, and the winding position in the actual shape of the liner 10, are determined, are stored in the storage unit 610 with respect to different conditions, as in the above-described example.

In the control routine of the second embodiment, the controller 600 selects winding conditions corresponding to a difference between the reference shape and the actual shape, in step S130A (see FIG. 5). Then, in step S140, the controller 600 controls the guide 110 according to the winding conditions corresponding to the difference, so as to wind the fiber 22 around the liner 10. In this embodiment, the controller 600 selects winding conditions corresponding to the winding position and winding angle in the reference shape of the liner 10, and the winding position in the actual shape of the liner 10.

According to the filament winding system of the second embodiment, the winding conditions corresponding to the differences are stored in advance in the storage unit 610; therefore, computations for correcting the winding conditions become unnecessary. As a result, the computation load in the filament winding system of the second embodiment can be reduced, as compared with that of the filament winding system of the first embodiment.

C. Third Embodiment

FIG. 6 is a flowchart illustrating a control routine of a third embodiment. A filament winding system of the third embodiment is different from that of the first embodiment in that (i) an n-layer reference shape as a shape obtained after the fiber 22 is wound around the liner 10 having the reference shape to form "n" layers ("n" is a positive integer) of the fiber 22, and (ii) (n+1)-layer winding conditions including the winding position at which the fiber 22 is wound around the liner 10 having the n-layer reference shape, are further stored in advance in the storage unit 610, but the system of the third embodiment is identical with that of the first embodiment in other respects. Also, the control routine of the third embodiment is difference from that of the first embodiment in that the routine includes step S140A in place of step S140, and further includes step S150 to step S190; however, the control routines of the first and third embodiments are identical with each other in other respects.

In step S140A of the control routine of the third embodiment, the guide 110 is controlled so that the fiber 22 that provides the first layer is wound around the liner 10. Here, the fiber 22 that provides the first layer refers to the fiber 22 that is wound around the liner 10 while the liner 10 makes one revolution about its center axis since winding of the fiber 22 around the liner 10 is started. Similarly, the fiber 22 that provides the n-th layer refers to the fiber 22 that is wound around the liner 10 while the liner 10 makes one revolution about its center axis, after the liner 10 makes n−1 revolutions about its center axis since winding of the fiber 22 around the liner 10 is started.

After step S140A, the controller 600 performs winding of the fiber 22 so as to form the second and subsequent layers of fiber, in a manner similar to that in the case where the fiber 22 that provides the first layer is wound. Namely, with regard to the fiber 22 for the second and subsequent layers, too, the fiber 22 is wound around the liner 10, after the shape of the liner 10 is measured before winding of the fiber 22 around the liner 10. In the following description, "n" ("n" is a positive integer) will be used, for the sake of easy understanding. More specifically, after step S140A, the controller 600 causes the measuring unit 130 to measure the shape of the liner 10 on which the "n" layers of the fiber 22 have been wound (step S150)

Then, the controller 600 determines the presence or absence of a difference between the n-layer reference shape stored in the storage unit 610, and the actual shape of the liner 10 measured by the measuring unit 130, on which the n layers of the fiber 22 have been wound (step S160). In this embodiment, the controller 600 determines that there is a difference when the difference is larger than a preset value, and determines that there is no difference when the difference is equal to or smaller than the preset value. In this embodiment, the determination is made using a distance between a position at which the fiber 22 that provides the (n+1)th layer is expected to contact with the liner 10, in the n-layer reference shape of the liner 10, and a position at which the fiber 22 that provides the (n+1)th layer is expected to contact with the liner 10, in the actual shape of the liner 10 on which the n layers of the fiber 22 have been wound. In this embodiment, the controller 600 determines that there is a difference when this distance is larger than 5 mm, and determines that there is no difference when the distance is equal to or smaller than 5 mm.

If the controller 600 determines that there is a difference between the n-layer reference shape and the actual shape (step S160: YES), the controller 600 corrects (n+1)th-layer winding conditions, using the difference between the reference shape and the actual shape (step S170). Then, the controller 600 controls the guide 110 according to the corrected (n+1)th-layer winding conditions, so as to wind the fiber 22 for the (n+1)th layer around the liner 10 (step S180).

On the other hand, if the controller 600 determines that there is no difference between the n-layer reference shape and the actual shape (step S160: NO), the controller 600 controls the guide 110 and the rotating device 120 according to the (n+1)th-layer winding conditions stored in advance in the storage unit 610, so as to wind the fiber 22 for the (n+1)th layer around the liner 10 (step S180).

After step S180, the controller 600 determines in step S190 whether winding of the fiber 22 is completed. If the controller 600 determines that winding has not been completed (step S190: NO), the control flow returns to step S150. If the controller determines that winding is completed (step S190: YES), the control flow ends.

According to the filament winding system of the third embodiment, the shape of the liner 10 after winding is measured each time one layer of the fiber 22 is wound, so that an error in winding of the fiber 22 can be reduced or eliminated. As a result, it is possible to curb a shortage of the strength of the tank 50, which would otherwise occur due to the error in winding of the fiber 22. Like the filament winding system of the second embodiment, a plurality of sets of (n+1)th-layer winding conditions corresponding to respective differences between the n-layer reference shape and the actual shape may be further stored in the storage unit 610 of the filament winding system of the third embodiment.

In this manner, computations for correcting the (n+1)th-layer winding conditions become unnecessary, and the computation load can be reduced.

D. Modified Example

While the liner 10 is used as the winding object in the above embodiments, the disclosure is not limited to this. For example, a pipe may be used as the winding object.

The present disclosure is not limited to the above embodiments and modified example, but may be realized with various arrangements, without departing from its principle. For example, the technical features in the embodiments and modified example, which correspond to the technical features described in the "SUMMARY" above, may be replaced or combined as appropriate, so as to solve a part or all of the above-described problems, or achieve a part of or all of the above-described effects. Also, the technical features may be deleted as appropriate, if they are not described as being essential to the disclosure in this specification.

What is claimed is:

1. A filament winding system comprising:
   a storage unit that stores in advance a reference shape of a winding object, and winding conditions including a winding position and a winding angle at which a fiber is wound around the winding object having the reference shape;
   a guide that is movable relative to the winding object, and is configured to feed the fiber onto the winding object;
   a rotating device configured to rotate the winding object, such that the fiber fed from the guide is wound around the winding object;
   a measuring unit configured to measure a shape of the winding object; and
   a controller configured to control the guide and the measuring unit, wherein
   the controller causes the measuring unit to measure the shape of the winding object, and
   when there is a difference between the reference shape stored in the storage unit, and the shape of the winding object measured by the measuring unit, the controller corrects the winding conditions so as to reduce or eliminate the difference, and controls the guide according to the corrected winding conditions, such that the fiber is wound around the winding object.

2. The filament winding system according to claim 1, wherein:
   the storage unit further stores in advance a plurality of sets of winding conditions corresponding to a plurality of differences; and
   when there is the difference between the reference shape stored in the storage unit, and the shape of the winding object measured by the measuring unit, the controller changes the winding conditions to the winding conditions corresponding to the difference, and controls the guide according to the corresponding winding conditions, such that the fiber is wound around the winding object.

3. The filament winding system according to claim 1, wherein:
   the storage unit further stores in advance an n-layer reference shape as a shape obtained after n layers of the fiber are wound around the winding object having the reference shape, and (n+1)th-layer winding conditions including a winding position at which the fiber is wound around the winding object having the n-layer reference shape, where n is a positive integer;

the controller causes the measuring unit to measure a shape obtained by winding the n layers of the fiber around the winding object; and when there is the difference between the n-layer reference shape stored in the storage unit, and the measured shape obtained by winding the n layers of the fiber around the winding object, the controller corrects the (n+1)th-layer winding conditions so as to reduce or eliminate the difference, and controls the guide according to the corrected (n+1)th-layer winding conditions, such that the fiber is wound around the winding object.

4. A filament winding system comprising:

a storage unit that stores in advance a reference shape of a winding object, and winding conditions including a winding position and a winding angle at which a fiber is wound around the winding object having the reference shape;

a guide that is movable relative to the winding object, and is configured to feed the fiber onto the winding object;

a rotating device configured to rotate the winding object, such that the fiber fed from the guide is wound around the winding object;

a measuring unit configured to measure a shape of the winding object; and a controller programmed to control the guide and the measuring unit, wherein the controller is programmed to cause the measuring unit to measure the shape of the winding object, and when there is a difference between the reference shape stored in the storage unit, and the shape of the winding object measured by the measuring unit, the controller is programmed to correct the winding conditions so as to reduce or eliminate the difference, and controls the guide according to the corrected winding conditions, such that the fiber is wound around the winding object.

* * * * *